United States Patent [19]

Wirth et al.

[11] 3,746,326

[45] July 17, 1973

[54] FLAME CUTTING TORCH CONTROL

[75] Inventors: Jon C. Wirth, Brookfield; Frederick J. Balfanz, Waukesha, both of Wis.

[73] Assignee: C-R-O Engineering Co., Inc., Brookfield, Wis.

[22] Filed: July 22, 1971

[21] Appl. No.: 165,261

[52] U.S. Cl. ............................................. 266/23 M
[51] Int. Cl. ............................................. B23k 7/10
[58] Field of Search ................................. 266/23 M

[56] References Cited
UNITED STATES PATENTS
3,032,328   5/1962   Petersen et al. .................. 266/23 M
FOREIGN PATENTS OR APPLICATIONS
1,160,704   8/1969   Great Britain .................... 266/23 M
  103,867   2/1964   Norway ............................ 266/23 M

*Primary Examiner*—Gerald A. Dost
*Attorney*—Andrus, Sceales, Starke & Sawall

[57] ABSTRACT

A fluid nozzle moves with the flame cutting torch and establishes a stream toward a plate to be cut. The back pressure in the nozzle actuates a fluid pressure-switch system having a variable set point control to actuate a torch positioner for high and low points as well as a lost plate. The switches actuate a reversible motor to position the torch and attached sensor with respect to the plate within the high and low points. The pressure-switch system may be individual fluid actuated switches for each of the three conditions or a pair of switches actuated from a fluid logic system.

If the plate is not sensed the motor is de-energized to hold the torch and the sensor in the last set position.

9 Claims, 3 Drawing Figures

PATENTED JUL 17 1973  3,746,326
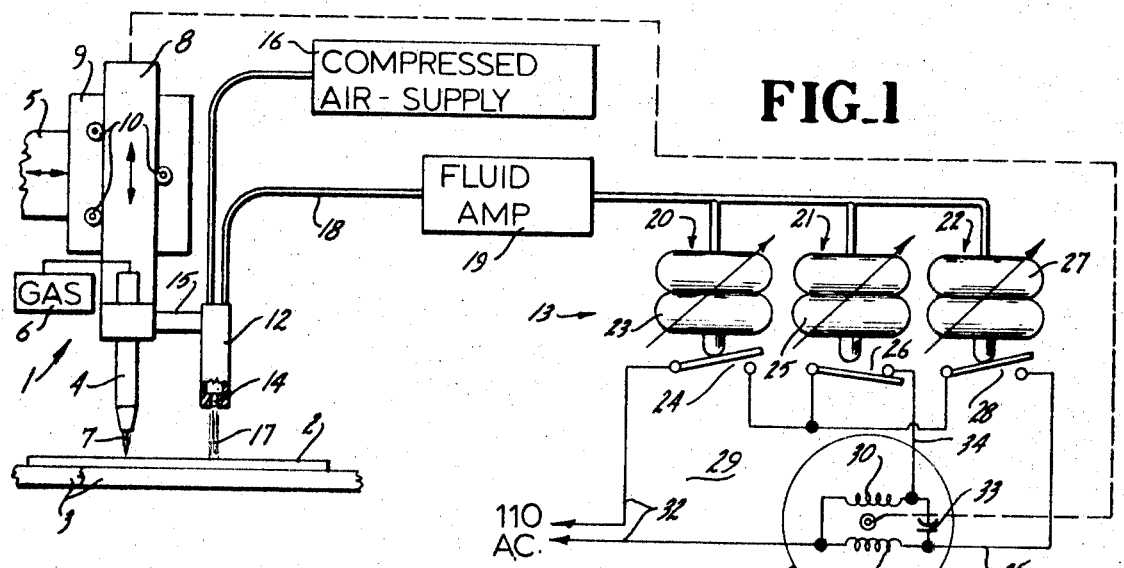
FIG.1
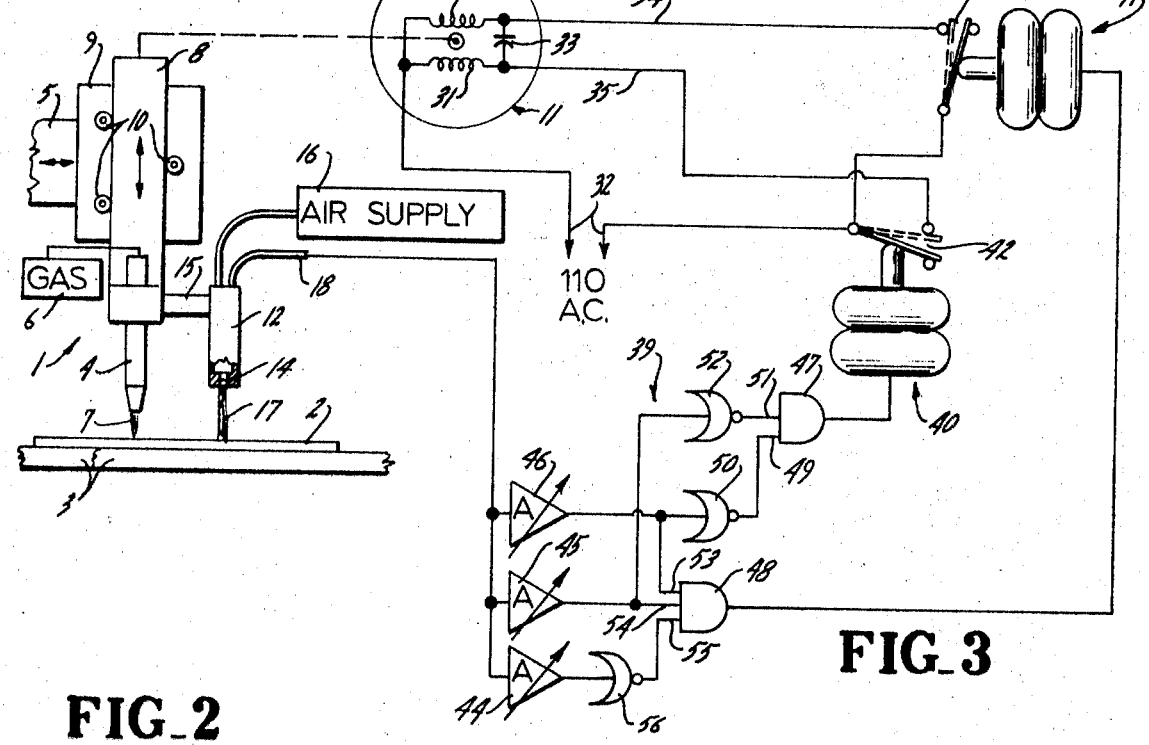
FIG.2
FIG.3
INVENTORS
JON C. WIRTH
FREDRICK J. BALFANZ
BY
Attorneys

FLAME CUTTING TORCH CONTROL

BACKGROUND OF THE INVENTION

This invention relates to a flame cutting torch height control and particularly to such a control for maintaining the torch within a predetermined spacing from the workpiece.

Metal plate or the like can be advantageously cut into desired configurations through the use of a flame cutting torch which establishes a cutting flame engaging and passing through the metal surface. The torch is generally mounted within a suitable movable support for traversing the metal workpiece in accordance with the desired configuration. The spacing between the tip of the torch and the metal plate should be held within a relatively close range to establish and maintain optimum cutting of the metal plate. If the torch tip too closely approaches the metal plate, uneveness in the metal plate may cause engagement with the tip, thereby extinguishing the flame and the cutting of the metal plate. If excessive spacing occurs, the quality of the cut may be adversely affected, and if the space is sufficiently great the cutting may be lost completely.

The environment of the cutting flame has presented substantial problems in connection with providing an automatic control of the spacing of the torch tip. Thus, the cutting flame establishes an extremely high ambient temperature, with significant temperature variations. Further, the cutting generates significant amounts of highly abrasive and electrically conductive iron oxides. These characteristics as well as the particular applications have resulted in numerous unsatisfactory attempts to provide commercially practical torch height regulation controls. Thus, physical followers engaging the workpiece have not been widely employed not only because of the environmental problems but because of problems associated with the random nature of the contours being formed. Further, any engagement between the follower or probe and a previous cut portion generates a false signal tending to move the torch downwardly which may and has resulted in destruction of the probe as well as cutting failure. The generation of the iron oxide within the cutting area essentially eliminates the satisfactory application of photoelectric systems and the like. Such environmental variations between the torch tip and the workpiece are such that capacitance measuring systems have generally not provided a satisfactory and reliable control. The cutting flame tends to ionize the air and the related temperature and moisture content results in variation in the dielectric between the torch tip and the workpiece thereby introducing further undesirable variations into a capacitance signal.

The detecting of the conductivity of the gas stream within the cutting flame or establishing of a separate conductive liquid stream such as a salt water stream and detecting variations in its conductivity thereof have been suggested in the prior art but have not been generally adapted for commercial applications.

Other similar electrical phenomena and magnetic sensing elements associated with the torch and the metal member have not been widely employed because of the expense and general instability associated with the high temperature environmental conditions immediately adjacent the cutting of the flame.

Thus, notwithstanding the relatively substantial development and the highly satisfactory commercial construction of a cutting torch apparatus as such, the workers in the art have long sought a reliable and commercially economic torch height adjustment control system for a cutting torch.

SUMMARY OF THE INVENTION

The present invention is particularly directed to a commercially practical and economic torch height control wherein a fluidic sensing stream is established with the output control directly in accordance with an upstream flow characteristic of the sensing stream and in a particularly practical construction wherein the back pressure within a stream nozzle is sensed and provides a fluid control signal for directly controlling the positioning of the torch with respect to the workpiece. Applicants have found that a fluidic back pressure sensing concept is not adversely affected by the environmental condition and does not vary with the normal changes encountered in such conditions. Thus, the controlled torch system provides an accurate and reliable sensed fluidic signal in the presence of normal operating variations and ambient temperature, humidity, dust, dirt and other normal foreign matter. Although the fluidic signal may be coupled to position the torch in any suitable manner including a hydraulic or fluid actuating means such as an air cylinder, Applicants have in a highly satisfactory system interfaced the fluidic signal with an electrical drive through a pneumatically actuated switching system which provides the desired command signal for moving the torch up and down.

In accordance with a further novel aspect of the present invention the signals are interconnected to provide for accurate positioning of the torch with an automatic holding of the last signalled position if the spacing suddenly increases beyond a selected outer limit, indicating that the torch and workpiece have moved completely out of alignment. In this manner, a single proximity sensor provides a continuous indication of low and high points as well as a lost plate condition.

More particularly in accordance with the present invention a signal stream nozzle is mounted as a proximity sensor immediately adjacent to and moving with the torch. The nozzle establishes an air stream or bubble engaging the workpiece, with the flow characteristics through the nozzle directly related to the spacing between the nozzle and the plate. As noted above, the back pressure of this signal provides a reliable indication of the space and in accordance with a preferred construction of the present invention the back pressure signal is coupled to a fluidic network to actuate a motor drive. Thus, the back pressure signal can be fed into one or more fluidic pressure sensors provided with a variable set point control to permit adjustment of the high and low points as well as the lost plate signal settings. The output of the fluidic pressure sensors are interconnected to actuate suitable electrical switches which in turn are interconnected to actuate a reversible electrical drive positioning motor which in turn is directly coupled to position the torch with respect to the plate. For example, in one practical embodiment the output pressure signal was amplified through a suitable fluid amplifier and applied to three pressure actuated switches. The switches were adjusted to respond to three different pressure levels corresponding respectively to a lost plate spacing, a high cutting point spacing and a low cutting point spacing, with respect to the metal plate or work surface. The lost plate spacing and the low point spacing switches are selected as normally open switches with the high point switch selected as a normally closed switch. The high point switch is connected to actuate the motor to lower the torch and is connected to power in series with the normally open lost plate switch. Thus the torch must be spaced with respect to the work surface less than the lost plate condition in order to permit any actuation of the torch. Assuming that the lost plate condition does not exist, the interposition of the workpiece and the turning on of the apparatus causes the torch to move downwardly until it enters the zone below the high point level or position. The related switch wll then open terminating the operation of the motor. If for any reason the spacing becomes less than the minimum length, the associated normally open contacts will close to actuate the motor in series with the lost plate switch to raise the torch into the desired operating range.

If for any reason during a cutting operation the plate should suddenly disappear with respect to the sensor, the lost plate switch will open thereby preventing the energization of the motor to raise or lower the torch which will be held with the sensor in the last set position. This will prevent adverse driving of the torch and sensor and thereby prevent damage to the associated equipment.

Alternatively in another embodiment, the output of the sensor can be connected through suitable adjustable fluid pressure amplifiers such as pure fluid amplifiers, diaphragm amplifiers or the like having adjustable means to provide control of the set point. The output of the several fluid amplifiers are interconnected through a fluid logic circuit to actuate a pair of electrical switches for raising and lowering of the motor. By providing individual multiple input gates, the logic can be established to energize the motor only if the torch senses a plate member within a predetermined lost plate spacing. If such a signal is established the associatdd high and low point settings will operate to effectively position the torch within the operating range.

Thus the present invention provides a highly improved fluidic sensor which has been found to provide reliable and practical control and which permits the interconnection of a single output sensor signal to not only provide positioning of the torch tip within a given range but prevents adverse signalling of the drive control if an abnormal lost plate condition arises.

BRIEF DESCRIPTION OF THE DRAWINGS

The drawing furnished herewith illustrates a preferred construction of the present invention in which the above advantages and features are clearly disclosed as well as others which will be readily understood from the following description.

In the drawing:

FIG. 1 is a diagrammatic illustration of a cutting torch assembly including a fluidic sensing unit interconnected to control a torch positioning motor in accordance with the teaching of the present invention;

FIG. 2 is a graphical illustration of the switching characteristic of the control circuitry shown in FIG. 1; and FIG. 3 is a view similar to FIG. 1 showing an alternative embodiment of the invention employing a fluidic logic interface between the sensor and the drive motor circuit.

DESCRIPTION OF THE ILLUSTRATED EMBODIMENTS

Referring to the drawing and particularly to FIG. 1, the invention is shown applied to control a flame cutting torch unit or assembly 1 which is movable with respect to a workpiece 2, which is generally a flat metal plate. A relatively fixed support 3 is provided to support the metal workpiece 2 with respect to a movable torch 4 forming a part of the flame cutting unit 1. As diagrammatically illustrated, the torch 4 is supported in a suitable machine fixture 7 which is movable in a horizontal direction for traversing the plate 2 in any desired configuration. The torch 4 is connected to a suitable gas supply 6 which supplies a gas stream, the gas stream generating a cutting flame 7 extending between the tip of the torch 4 and the metal workpiece 2. The length of the flame 7 is controlled by the relatively spacing of the tip of the torch 4 with respect to the workpiece 2 and is preferably held within a relatively close range. For example, the torch tip spacement may be in a range with a minimum spacing of 0.500 inches and a maximum spacing of 0.560 inches for optimum cutting characteristics. The characteristic of the plate 2 may be such that the spacing and length of the flame vary beyond such limits if the torch 4 is held at an initial center point for example with respect to the workpiece 2. It is thus desirable to provide for an automatic vertical positioning of the torch 4 with respect to the surface of the metal plate and thereby maintain and control a constant torch height and/or flame length.

In the illustrated embodiment of the invention, the torch 4 is secured to carriage 8 which is slidably mounted within a support bracket 9 carried by the machine bracket 5. The carriage 8 may be suitably supported by roller bearings 10 or the like for convenient vertical positioning of the carriage 8 shown attached to a reversible electric positioning motor 11 which is automatically energized.

As the construction of the flame cutting unit 1 may take any desired practical construction, many of which are well-known in the art, no further detailed description of such apparatus or its construction is given.

In accordance with the present invention, the acutation of the motor 11 for the positioning of the torch 4 is controlled by a closed loop system including a fluidic backpressure sensor 12 mounted as a part of the torch assembly and establishing a fluid signal which is coupled to a transducing control circuit 13 for interconnection and actuating of the motor 11 in accordance with any variation in the spacing of the torch beyond a designed limit.

In the illustrated embodiment of the invention, the sensor 12 is shown as a nozzle having a stream forming orifice 14. The nozzle sensor 12 is secured and mounted with the torch 4 by a suitable bracket 15. The tip of the nozzle 12 is generally closely spaced adjacent the torch 4 and connected to a suitable supply of air or other suitable fluid medium 16. The orifice 14 establishes a sensing air stream or bubble 17 directed into and engaging the workpiece 2. The nozzle 12 is mounted adjacent to the side of torch 4 and the stream 17 engages the metal workpiece 2 in closely spaced relation to the plane of the workpiece 2 and in the illustrated embodiment to the leading side of the flame movement. Thus any change in the vertical position of the surface of the workpiece 2 is reflected in an essentially simultaneous variation in the spacing of the plate 2 with respect to the nozzle 12, which would result in a corresponding change with respect to torch 4 and the length of flame 7. This change in turn results in a variation in the flow characteristic of the sensing stream 17 and in particular a variation in the back pressure within the nozzle 12 and a connecting back pressure signal line 18 connected to the nozzle 12. The fluid pressure in line 18 provides a corresponding output pressure signal directly related to the spacing between the nozzle 12 and workpiece 2. In the illustrated embodiment of the invention, the back pressure line 18 is connected to a suitable fluid amplifier 19, such as a diaphragm amplifier or a pure fluid amplifier or the like to increase the level of the back pressure signal to a desired level without loading of the sensor 12. The output of the amplifier 19 is connected as a common input signal to three pressure responsive switch units 20, 21 and 22 related respectively to a maximum or lost plate position of the torch with respect to the workpiece, a high point cutting position or spacing and a low point cutting position or spacing of the tip of the torch 4 with respect to the metal workpiece 2.

Each of the pressure responsive swtich units 20 through 22 inclusive is similarly constructed, and are diagrammatically illustrated. Switch unit 20 is shown including a pneumatic actuator such as a bellows 23 which is interconnected to actuate a set of normally open contacts 24. Switch 21 similarly includes a pneumatic actuator 25 coupled to actuate a set of normally closed contacts 26 and switch unit 22 includes an actuator 27 coupled to actuate a set of normally open contacts 28. The several contacts are interconnected in a control circuit 29 to energize the motor 11.

The motor 11 is schematically shown as a well-known capacitive-start, capacitive-run motor including a down-running winding 30 and an up-running winding 31 having one side interconnected in common to one side of a set of incoming alternating incoming power leads 32. A capacitor 33 interconnects the opposite sides of the windings 30 and 31 to each other. Each of the windings 30 and 31 is individually connected via a down running lead 34 and an up running lead 35 respectively to the opposite side of the incoming power leads 32 via the switches 24, 26 and 28 of the pressure responsive switch units 20–22.

In particular, the down lead 34 is interconnected in series with the normally closed contacts 26 of the switch unit 21 in series with the normally open contacts or switch 24 of the switch unit 20. The up lead 35 is similarly connected directly to the normally open contacts 28 of the switch unit 22 and in series with the switch 24 to the corresponding power lead 32. Thus, depending upon which of the switches 26 or 28 is closed the motor 11 is conditioned to operate in the corresponding up or down direction. However, neither winding 30 or 31 can be energized to actuate the motor unless the common switch 24 is closed to provide power to the switches 26 and 28.

In the absence of the positioning of a plate in the system and the turn on of power, the circuit will be in the condition shown in FIG. 1. When the plate or workpiece 2 is inserted in place and the apparatus energized, the sensor 12 will establish a back pressure signal which when amplified is sufficient to actuate the pneumatic responsive switch unit 20, with the operation of the pneumatic actuator 23 to a level closing the switch 24. This provides an input signal to the motor circuit 29. In the standby or starting position, the pneumatic switch unit 21 has its associated contacts or switch 26 closed, which in turn provides power directly to the down running winding 30 and in series with the capacitor 33 to the up running winding 31. This energizes the motor 11 to rotate and cause the carriage 8 and torch to move downwardly. The sensor 12 simultaneously moves downwardly and the back pressure in the sensing unit rises. At a selected level, the pneumatic actuator 25 of high point unit 21 is operative to open the switch 26 thereby opening the circuit to the motor 11. The torch 4 will then be held in such position.

If the spacing should drop below a selected level or distance, the back pressure of a sensor 12 will increase accordingly. The increased pressure will of course maintain the switch 24 closed and switch 26 open. When it reaches a selected low point position, however, the pressure in the pneumatic actuator 27 of the low point unit 22 rises to the low set point and close the switch 28. This completes a power input path directly to the up running winding 31 and in parallel through the capacitor 33 in series with the down-running winding 30. The motor 11 is now energized to operate in the reverse direction, moving the carriage 8 and the associated torch 4 and sensor 12 upwardly until the pneumatic signal drops below the low set point.

Thus the system will provide a continuous monitoring of the position of the torch 4 and reposition the torch 4 within the high and low set points.

In addition, if for any reason, the torch 4 and the sensor 12 disengage a metal workpiece 2 thereby creating sudden loss in the back pressure signal, the drop in pressure in the line 18 and thus in the several switch units 20–21 will be such that the switch unit 20 will return to the normal standby position with the switch 24 open. This completely removes power from the motor control circuit via the up and down running windings 30 and 31 and holds the torch assembly in the last position, which prevents any possible danger of continuously operating the motor beyond the desired limits.

FIG. 2 diagrammatically illustrates the operation with the lost plate switch level for operating switch 20 shown by line 36 and the high and low point settings for operating of switches 26 and 28 shown by limit switch level lines 37 and 38. Thus under normal operation the torch will be held within the range of the pressure and related distances indicated by the level lines 37 and 38. If for any reason the distance and the related pressure signal should rise to the level of line 36, the motor 11 is positively disconnected from the input power supply to hold thd motor in the last position. When a plate 2 is again re-engaged by the sensor 12, the switch 24 will again close and the switches 26 and 28 will be actuated through the pneumatic switch units 21 and 22 to hold the switch in the desired cutting range or spacing.

Thus the torch is held within the operating range but is held at the last relative position if the distance between the surfaces increase so rapidly as to indicate a total malfunctioning.

The pressure switches are preferably adjustable to permit variation of setting in the various spacings and in particular the high and low point set points. Although separately individually adjustable pneumatic switches can be employed, as diagrammatically shown in the first embodiment of FIG. 1, a fluidic logic system such as shown in FIG. 3 may also advantageously be employed. Generally, the cutting torch assembly in the sensor assembly as shown in FIG. 3 corresponds to that shown in FIG. 1 with only the interfacing modified in accordance with a further aspect of the present invention. Consequently, the corresponding elements of FIGS. 2 and 1 and similarly numbered for simplicity and clarity of explanation and the change in the interfacing is particularly described hereinafter.

Thus referring particularly to FIG. 3, the back pressure signal line 18 is connected as an input to a fluidic logic circuit 39, the output of which is interconnected to actuate a pair of switch units including a down switch unit 40 and an up switch unit 41. Each of the units 40 and 41 are similarly formed with a pneumatic acutator coupled to close a normally open set of contacts or switch 42 and 43, respectively.

The illustrated fluidic logic circuit 39 includes three individual adjustable pressure amplifiers 44, 45 and 46 having their inputs connected in common to the back pressure signal line 18. The amplifiers 44–46 may be any suitable fluid amplifiers providing step or binary logic output signals at the desired set point levels. In the illustrated embodiment of the invention the pressure amplifier 44 provides a signal related to the lost plate spacing, amplifier 45 is selected to provide a signal for the high set point and amplifier 46 for the low set point. The output signal of the several amplifiers will be at a logic zero output until the pressure signal applied corresponds to the set point at which the corresponding amplifier has been adjusted.

The outputs of the amplifiers are connected to suitable fluid AND gates 47 and 48 for correspondingly actuating the related switch units 40 and 41.

The gate 47 is shown as a dual input gate having a first input 49 connected through a fluid logic inverter 50 to the output of the amplifier 46. The second input 51 of the gate 47 is connected through a similar inverter 52 to the output of the amplifier 45. The dual input gate 47 establishes a logic zero output signal to the related actuator of the switch unit 40 with a logic 1 signals simultaneously applied to the two inputs.

The gate 48 is a three input gate having a first input 53 connected to the output of amplifier 46, a second input 54 connected to the amplifier 45, a third input 55 connected to the amplifier 46 via a fluid inverter logic unit 56. Logic gate 48 is such that the pressure signal must be at a level actuating the first pressure amplifier 44 to produce an input signal to the gates but with the pressure level below that to actuate the amplifiers 45 and 46.

As the pressure increases to the level of the high print setting, the output of amplifier 45 switches on and produces a cutoff signal to the gate 48. The output of amplifier is inverted by gate 52 and conditions gate 47 to actuate unit 40. However, gate 47 is held off by the inverted output of the low point amplifier 46. If the signal continues to increase, the amplifier 46 switches on. The further drives gate 48 off to insure holding of switch 41 open. The inverted output of amplifier 46 is applied to gate 47. This triggers gate 47 to actuate switch unit 40 to energize winding 31 directly and raise the winding.

If the plate is lost, the sudden pressure loss resets the logic circuit and positively holds both switch units deactivated to maintain the torch 4 and sensor 12 in the last set position.

The present invention thus provides a reliable height control unit for a cutting flame torch or the like wherein environmental conditions have restricted the success of prior art devices.

Various modes of carrying out the invention are contemplated as being within the scope of the following claims, particularly pointing out and distinctly claiming the subject matter which is regarded as the invention.

We claim:

1. A flame cutting torch assembly for flame cutting of a workpiece and the like comprising a cutting torch means establishing a cutting flame directed into engagement with said workpiece, position sensor means establishing a fluid sensing stream for engagement of the workpiece adjacent to said flame, drive means for positioning said cutting torch means and said sensor means relative to the workpiece, control means for sensing the flow characteristic of said sensing stream and connected to actuate said drive means to selectively position said torch means and said sensor means with respect to said workpiece, said torch means being held within a predetermined maximum and minimum spacing from the workpiece, and said ontrol means includes a first response means responsive to said minimum spacing to actuate the drive means to move the support means away from said work member, a second response means responsive to said maximum spacing to actuate the drive means to move the support means toward the work member, and a third response means responsive to a spacing of the torch unit from said work member in a predetermined excess of said maximum spacing to deactivate said drive means.

2. The cutting torch assembly of claim 1 havinga common movable support member coupled to said drive means for moving said support member, said cutting torch means being secured to said support member, said sensor means including a nozzle means secured to said support member in predetermined relationship to said cutting torch, said nozzle means having an orifice establishing said fluid sensing stream, and said control means sensing the back pressure in said nozzle means upstream of said orifice and connected to actuate said drive means to selectively position said torch means with respect to said workpiece.

3. The cutting torch assembly of claim 2 wherein said first, second and third response means are responsive to the back pressure to correspondingly actuate the drive means.

4. The cutting torch assembly of claim 1 wherein said drive means including a reversible electric motor having an up-running input means and a down-running input means, and said control means establishes a fluid pressure signal in accordance with the spacing of the torch means from said workpiece, and said drive means including fluid pressure activated switch means selectively supplying power to said input means to selectively position said torch means with respect to said workpiece.

5. The cutting torch assembly of claim 4 wherein said switch means includes a first fluid activated switch connected to the down running input means and a second fluid activated switch connected to the uprunning input means, and a lost work means coupled to both said switches to prevent operative actuation of the switches in the absence of workpiece in the path of said stream.

6. The cutting torch assembly of claim 4 wherein said switch means includes a first fluid activated switch connected to the down running input means and a second fluid activated switch connected to the up running input means, a common lost plate fluid activated switch connected to both said first and second switches for controlling power input to said switches, and each of said switches having a fluid signal input means connected in common to said control means to simultaneously apply said fluid pressure signal to said switches.

7. The cutting torch assembly of claim 4 wherein said switch means includes a first fluid activated switch connected to the down running input means and a second fluid activated switch connected to the up running input means, a first dual input fluid logic gate connected to said second switch, a second triple input fluid logic gate connected to said first switch, three adjustable fluid pressure amplifiers connected in common to said control means and establishing binary logic signals related to said fluid pressure signal, the first of said amplifiers establishing a signal related to selected minimum spacing of the torch from the workpiece and connected to one input of said second logic gate, the second of said amplifiers establishing a signal related to a selected maximum spacing of the torch from the workpiece and connected to a second input of said second logic gate, the third of said amplifiers establishing a signal related to a selected spacing in excess of said maximum, inverting signal means connecting said third amplifiers to the third input of said second logic gate, and inverting signal means connecting each of said first and second amplifiers to one each of one input of said first gate.

8. A cutting torch assembly comprising a torch unit to be held within a predetermined maximum and minimum spacing from the workpiece, and control means including a first detecting and response means responsive to said minimum spacing to move the torch unit away from said work member, a second detecting and response means responsive to said maximum spacing to move the torch unit toward the work member, a third detecting and response means responsive to a spacing of the torch unit from said work member in a predetermined excess of said maximum spacing to hold said torch unit in the last position, said control means including a fluid sensing means having a flowing detection stream engaging said workpiece and coupled to actuate said response means.

9. A cutting torch assembly comprising a torch unit to be held in alignment with and within a predetermined spacing from the workpiece, control means connected to said sensing means and including a detecting and response means responsive to said fluid signal to move the torch unit with respect to said workpiece to provide a controlled spacing of the torch unit relative to the work member, and a work loss detecting and response means responsive to the fluid signal with torch unit and workpiece out of alignment to hold said torch unit in the last position.

* * * * *